(12) United States Patent
Iwata et al.

(10) Patent No.: US 6,352,765 B1
(45) Date of Patent: Mar. 5, 2002

(54) MAGNETO-OPTICAL RECORDING MEDIUM AND REPRODUCING DEVICE

(75) Inventors: Noboru Iwata, Tenri; Junji Hirokane, Nara, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/458,392

(22) Filed: Dec. 10, 1999

(30) Foreign Application Priority Data

Dec. 10, 1998 (JP) .......................................... 10-351221

(51) Int. Cl.$^7$ ................................................. G11B 5/66
(52) U.S. Cl. ................ 428/332; 428/336; 428/694 ML; 428/694 RE; 428/694 MM; 428/694 EC; 428/900; 369/13; 369/275.5; 369/275.4; 369/284; 369/286; 369/288; 360/53; 360/114
(58) Field of Search ................... 428/694 ML, 694 RE, 428/694 NM, 694 EC, 694 G, 900, 332, 336; 369/13, 275.5, 275.4, 284, 286, 288; 360/53, 114

(56) References Cited

U.S. PATENT DOCUMENTS 6,030,716 A * 2/2000 Izumi .................. 428/694 ML

OTHER PUBLICATIONS

"High–Density Magneto–Optical Recording With Domain Wall Displacement Detection", T. Shiratori, et al. Joint Magneto–Optical Recording International Symposium/International Symposium on Optical Memory 1997 Technical Digest, Tu–E–04, pp. 38–39.

* cited by examiner

*Primary Examiner*—Leszek Kiliman
(74) *Attorney, Agent, or Firm*—David G. Conlin; William J. Daley, Jr.; Dike, Bronstein, Roberts and Cushman, Intellectual Property Practice Group of Edwards & Angell, LLP

(57) ABSTRACT

A magneto-optical recording medium includes at least a first magnetic layer, a second magnetic layer and a third magnetic layer which are layered in this order, the first magnetic layer being formed of a perpendicularly magnetized film having a relatively small wall coercivity and a relatively large wall mobility compared with the third magnetic layer in the vicinity of a predetermined temperature, and the magneto-optical recording medium satisfies conditions Tc2<Tcomp1<Tc1 and Tc2<Tcomp1<Tc3 where Tcomp1 is a compensation temperature of the first magnetic layer, Tc1, Tc2 and Tc3 are Curie temperatures of the first, second and third magnetic layers, respectively.

17 Claims, 10 Drawing Sheets

MAGNETO-OPTICAL RECORDING MEDIUM AND REPRODUCING DEVICE

FIELD OF THE INVENTION

The present invention relates to magneto-optical recording media, such as magneto-optical disks, magneto-optical tapes and magneto-optical cards, and a reproducing device for reproducing information on such a magneto-optical recording medium.

BACKGROUND OF THE INVENTION

A magneto-optical recording medium has been practically used as a rewritable optical recording medium. Information is recorded on and reproduced from a magneto-optical recording medium with a converged light beam emitted from a semiconductor laser. However, the magneto-optical recording medium has such a drawback that the reproduction properties deteriorate when the diameter of a recording bit as a recording-use domain and the interval of the recording bits become smaller with respect to the diameter of the light beam.

When the diameter of the recording bit and the interval of the recording bits become smaller with respect to the diameter of the light beam, a recording bit adjacent to a target recording bit enters into the diameter of the light beam converged on the target recording bit. As a result, individual recording bits can not be read out separately and the reproduction properties deteriorate.

A structure for solving the above drawback of the magneto-optical recording medium is proposed in "High-Density Magneto-Optical Recording with Domain Wall Displacement Detection" (Joint Magneto-Optical Recording International Symposium/International Symposium on Optical Memory 1997 Technical Digest, Tu-E-04, p. 38,39). In this magneto-optical recording medium, the first, second and third magnetic layers are layered in this order. The first magnetic layer is made of a perpendicularly magnetized film having a relatively small wall coercivity and a relatively large wall mobility compared with those of the third magnetic layer in the vicinity of a readout temperature. The Curie temperature of the second magnetic layer is set lower than the Curie temperatures of the first and third magnetic layers. According to this structure, even when the recording bit diameter and the recording bit interval are small, individual recording bits can be read out separately without lowering the readout signal level, by moving the domain wall into a region where the temperature has been rased by the irradiation of a light beam.

A method of reproducing information on the magneto-optical recording medium with the above-described structure will be explained with reference to FIG. 8.

A first magnetic layer 110, a second magnetic layer 120 and a third magnetic layer 130 are layered in an exchange coupled state. Denoting the Curie temperatures of the first through third magnetic layers in the laminated state by Tc110, Tc120 and Tc130, respectively, Tc110 and Tc120 satisfy the relationship Tc120<Tc110. In FIG. 8, the arrows show the direction of transition metal magnetic moments of the respective magnetic layers. Here, magnetic domains have already been recorded in the third magnetic layer 130, and an upwardly oriented magnetic domain and a downwardly oriented magnetic domain are present alternately in a repeated manner.

When a reproduction-use light beam 104 is irradiated and converged on such a magneto-optical recording medium from the first magnetic layer 110 side, the second magnetic layer 120 has a region heated to a temperature equal to or higher than its Curie temperature. In a region having a temperature equal to or lower than the Curie temperature, the magnetic domain information in the third magnetic layer 130 is copied to the first magnetic layer 110 through the second magnetic layer 120 by the exchange coupling. In other words, the upward transition metal magnetic moment at the front part of a region 108 irradiated with the light beam is copied as it is from the third magnetic layer 130 to the first magnetic layer 110.

On the other hand, in the region heated to a temperature equal to or higher than the Curie temperature of the second magnetic layer 120 (the region located behind the light beam 104 by a movement of the medium such as a rotation of a disk substrate), since the exchange coupling between the first magnetic layer 110 and third magnetic layer 130 is cut off by the second magnetic layer 120, the domain wall in the first magnetic layer 110 is readily movable.

When the information in the third magnetic layer 130 is copied as it is to the first magnetic layer 110, a domain wall 105 is essentially formed. However, in the region where the second magnetic layer 120 has been heated to a temperature equal to or higher than its Curie temperature, since the domain wall in the first magnetic layer 110 is readily movable, the domain wall 105 moves to the most stable location. Here, considering a fact that the domain wall energy density decreases with an increase in temperature, the domain wall 105 moves to a location where the temperature is increased most by the irradiation of the light beam 104, a and forms a domain wall 106.

Thus, in the magneto-optical recording medium of the above-described structure, since the domain wall can be moved by the characteristic of the second magnetic layer 120, the recording domain in the third magnetic layer 130 can be enlarged in the first magnetic layer 110. Therefore, even when the recording domain is reduced, it is possible to increase the amplitude of the readout signal from the first magnetic layer 110, thereby allowing readout of signals of a cycle l less than the diffraction limit of light.

However, in the above-mentioned reproduction method, there are two types of domain movements, i.e., a domain movement from the front part and a domain movement from the rear part. Hence, there is a problem that a single domain is read out twice. Referring now to FIGS. 9 and 10, the following description will explain this point.

FIG. 9 shows a state in which an independent magnetic domain 107 formed in the third magnetic layer 130 is present at the front part of the light beam 104, the third magnetic layer 130 and first magnetic layer 110 are exchange coupled at the position of the independent magnetic domain 107, and the upward moment is copied to the first magnetic layer 110. In FIG. 9, the shaded portion of the second magnetic layer 120 is a region X where the second magnetic layer 120 is heated to its Curie temperature or a higher temperature.

In the state shown in FIG. 9, the domain wall 105 moves to the position of the domain wall 106 to enlarge the magnetic domain, and a readout magnetic domain 109 with an upward moment is formed in the region 108 irradiated with the light beam 104. Therefore, a large readout signal amplitude is obtained.

When the medium (magneto-optical recording medium) is moved relatively to the light beam 104 from the state shown in FIG. 9, a downward moment of the third magnetic layer 130 is copied to the first magnetic layer 110 upon passage of the independent magnetic domain 107 through the region X, and the moment in the readout magnetic domain 109 is also oriented downward.

Further, when the medium is moved into a state shown in FIG. 10, i.e., the independent magnetic domain 107 is located at the rear part of the region X of the second magnetic layer 120, the upward moment of the independent magnetic domain 107 in the third magnetic layer 130 is copied to the first magnetic layer 110, and a domain wall 105' moves to the position of a most stable domain wall 106'. Thus, a readout magnetic domain 140 with an upward moment exists in the region 108 irradiated with the light beam 104.

As described above, the independent magnetic domain 107 is read out once when it is located at the front part of the region X where the second magnetic layer 120 is heated to its Curie temperature or above by the irradiation of the light beam (in the state shown in FIG. 9), and read out again when it is located at the rear part of the region X (in the state shown in FIG. 10). This phenomenon is noticeable in a relatively long recording magnetic domain where the exchange coupling between the third magnetic layer 130 and first magnetic layer 110 is stable as disclosed in "High-Density Magneto-Optical Recording with Domain Wall Displacement Detection" (Joint Magneto-Optical Recording International Symposium/International Symposium on Optical Memory 1997 Technical Digest, Tu-E-04, p. 38,39).

Thus, in a conventional magneto-optical recording medium, since a relatively long recording magnetic domain can not be read out in a stable manner, a serious problem will occur when performing recording and reproduction by a mark edge recording method in which information is recorded at a higher density.

SUMMARY OF THE INVENTION

An object of the present invention is to provide a magneto-optical recording medium which enables readout of signals of a cycle equal to or less than the diffraction limit of light without lowering the amplitude of the readout signals and does not cause repetitious readout even in a long recording magnetic domain.

In order to achieve the above object, a magneto-optical recording medium of the present invention is characterized by including at least a first magnetic layer, a second magnetic layer and a third magnetic layer which are layered in this order, the first magnetic layer being formed of a perpendicularly magnetized film with a relatively small wall coercivity and a relatively large wall mobility compared with the third magnetic layer in the vicinity of a predetermined temperature, and the magneto-optical recording medium satisfying conditions $Tc2 < Tcomp1 < Tc1$ and $Tc2 < Tcomp1 < Tc3$ where $Tcomp1$ is a compensation temperature of the first magnetic layer, $Tc1$, $Tc2$ and $Tc3$ are the Curie temperatures of the first, second and third magnetic layers, respectively.

According to this structure, during reproduction, a region heated to the Curie temperature of the second magnetic layer or a higher temperature is formed in the second magnetic layer, and a light beam which has been controlled to an intensity capable of forming a region having the compensation temperature or a higher temperature in the first magnetic layer is irradiated on the magneto-optical recording medium. In this case, a domain wall in the first magnetic layer tries to move to a position where the temperature is increased most by the irradiation of the light beam. However, in a high-temperature region of the first magnetic layer, since the t temperature is increased to the vicinity of the compensation temperature, the wall coercivity is extremely large, and the movement of the domain wall is stopped in the vicinity of the compensation temperature. Therefore, an enlarged domain wall does not enter into a region heated to a temperature equal to or higher than the compensation temperature of the first magnetic layer, thereby limiting a movement of the domain wall from the rear end of the light beam.

Therefore, even when a recording magnetic domain is long, it can be readout accurately. Thus, this structure can cope with high-density mark edge recording.

Consequently, magnetic domain enlargement readout is realized without causing repetitious readout, and signals of a cycle equal to or less than the diffraction limit of light can be read out without lowering the amplitude of the readout signals, thereby significantly improving the recording density.

Moreover, in order to reproduce information on the above-mentioned magneto-optical recording medium, a reproducing device of the present invention is characterized by including:

irradiating means for irradiating a light beam on the magneto-optical recording medium during reproduction; and control means for controlling the irradiation intensity of the light beam to an intensity capable of heating the first magnetic layer of the magneto-optical recording medium to the compensation temperature or a higher temperature.

In other words, the reproducing device of the present invention heats the magneto-optical recording medium to a predetermined temperature (readout temperature) or a higher temperature by the irradiation of the light beam by the irradiating means, and controls the light beam, which is controlled to an intensity capable of forming a region having the compensation temperature or a higher temperature in the first magnetic layer, to be irradiated on the magneto-optical recording medium by the control means when reproducing information recorded on the magneto-optical recording medium. Incidentally, the intensity of the light beam is controlled by the control means of the reproducing device. Thus, with the use of this reproducing device, the information on the magneto-optical recording medium including the first magnetic layer can be satisfactorily reproduced.

For a fuller understanding of the nature and advantages of the invention, reference should be made to the ensuing detailed description taken in conjunction with the accompanying drawings.

DESCRIPTION OF THE PREFERRED EMBODIMENT

The following description will explain an embodiment of the present invention.

In the following description, a magneto-optical recording medium of the present invention is explained. First, the principle of the magneto-optical recording medium of the present invention will be explained.

Figure 1:
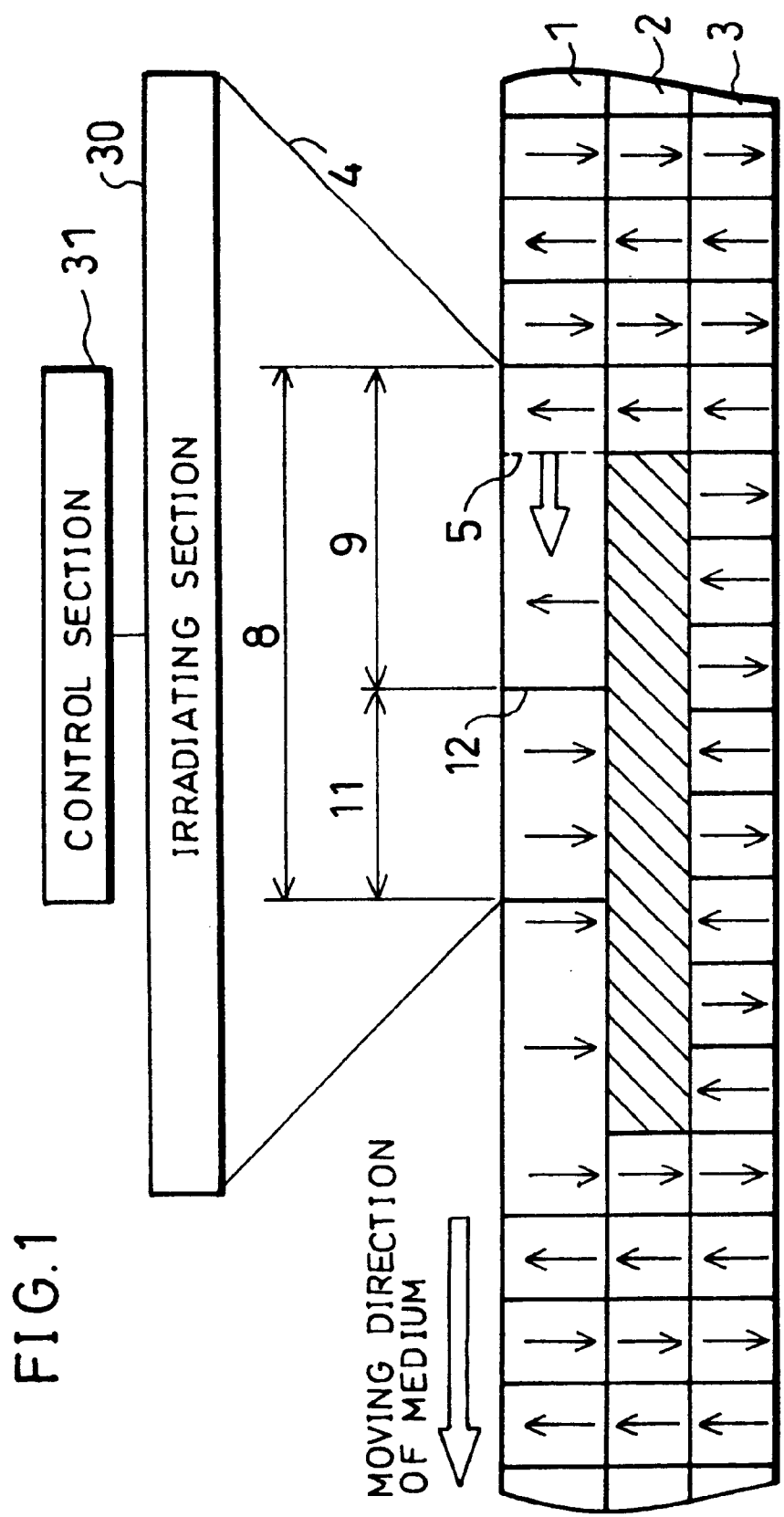
FIG. 1 is an explanatory view explaining the principle of reproducing a magneto-optical disk of the present invention.

FIG. 1 is a cross section showing a state of reproducing information from the magneto-optical recording medium of the present invention. The magneto-optical recording medium of the present invention includes a first magnetic layer (readout layer) 1, a second magnetic layer 2 and a third magnetic layer (recording layer), which are layered in this order. The first magnetic layer 1 is formed of a perpendicularly magnetized film made of a rare earth and transition metal alloy having relatively small wall coercivity and relatively large wall mobility compared with the third magnetic layer 3 in the vicinity of a readout temperature.

The magnetic properties of the respective magnetic layers are set so as to satisfy conditions $Tc2 < Tcomp1 < Tc1$ and $Tc2 < Tcomp1 < Tc3$ where Tcomp1 is a compensation temperature of the first magnetic layer 1, Tc1, Tc2 and Tc3 are the Curie temperatures of the first magnetic layer 1, second magnetic layer 2 and third magnetic layer 3, respectively.

On such a magneto-optical recording medium, information is recorded as upward and downward magnetic moments in the third magnetic layer 3. Meanwhile, the recorded information is read out as follows.

At temperatures no higher than the Curie temperature of the second magnetic layer 2, the first magnetic layer 1, second magnetic layer 2 and third magnetic layer 3 layered in this order are exchange-coupled, and the information recorded in the third magnetic layer 3 is copied to the first magnetic layer 1 through the second magnetic layer 2 by the exchange coupling.

During reproduction, a region heated to a temperature equal to or higher than the Curie temperature of the second magnetic layer 2 is formed in the second magnetic layer 2 by irradiating a light beam 4 from the first magnetic layer 1 side by an irradiating section 30 of a reproducing device. At this time, in the heated region, since the magnetization of the second magnetic layer 2 disappears, the exchange coupling is cut off, and the domain wall positioned in the heated region of the first magnetic layer 1 is readily movable. Therefore, in the region where the second magnetic layer 2 is heated to a temperature equal to or higher than the Curie temperature, a domain wall 5 moves backward, thereby forming a large magnetic domain.

According to a conventional structure, when reproducing information from a relatively long recording magnetic domain, a displacement of a domain wall from the rear end of the light beam 4 irradiated on the first magnetic layer 1 will also occur, causing a problem that a single magnetic domain is read out repetitiously as mentioned above.

Hence, the magneto-optical recording medium of the present invention is designed so that the first magnetic layer 1, second magnetic layer 2 and third magnetic layer satisfy the conditions $Tc2 < Tcomp1 < Tc1$ and $Tc2 < Tcomp1 < Tc3$.

Meanwhile, when reproducing information, the irradiating section 30 of the reproducing device irradiates the light beam 4 on the magneto-optical recording medium so as to heat the magnet-optical recording medium to a predetermined temperature (readout temperature) or a higher temperature. More specifically, the irradiating section 30 irradiates the magneto-optical recording medium with a light beam which is controlled to an intensity capable of forming a region having a compensation temperature or a higher temperature in the first magnetic layer 1. The intensity of the light beam 4 is controlled by a control section 31 of the reproducing device.

According to this structure, the domain wall in the first magnetic layer 1 tries to move to a position where the temperature is increased most by the irradiation of the light beam 4. However, in a high-temperature region of the first magnetic layer 1, since the temperature is increased to the vicinity of the compensation temperature, the wall coercivity is extremely large, and the movement of the domain wall is stopped in the vicinity of the compensation temperature. Therefore, an enlarged domain wall does not enter into a region 11 heated to a temperature equal to or higher than the compensation temperature of the first magnetic layer 1, thereby limiting a movement of a domain wall 5' from the rear end of the light beam 4.

Figure 2:
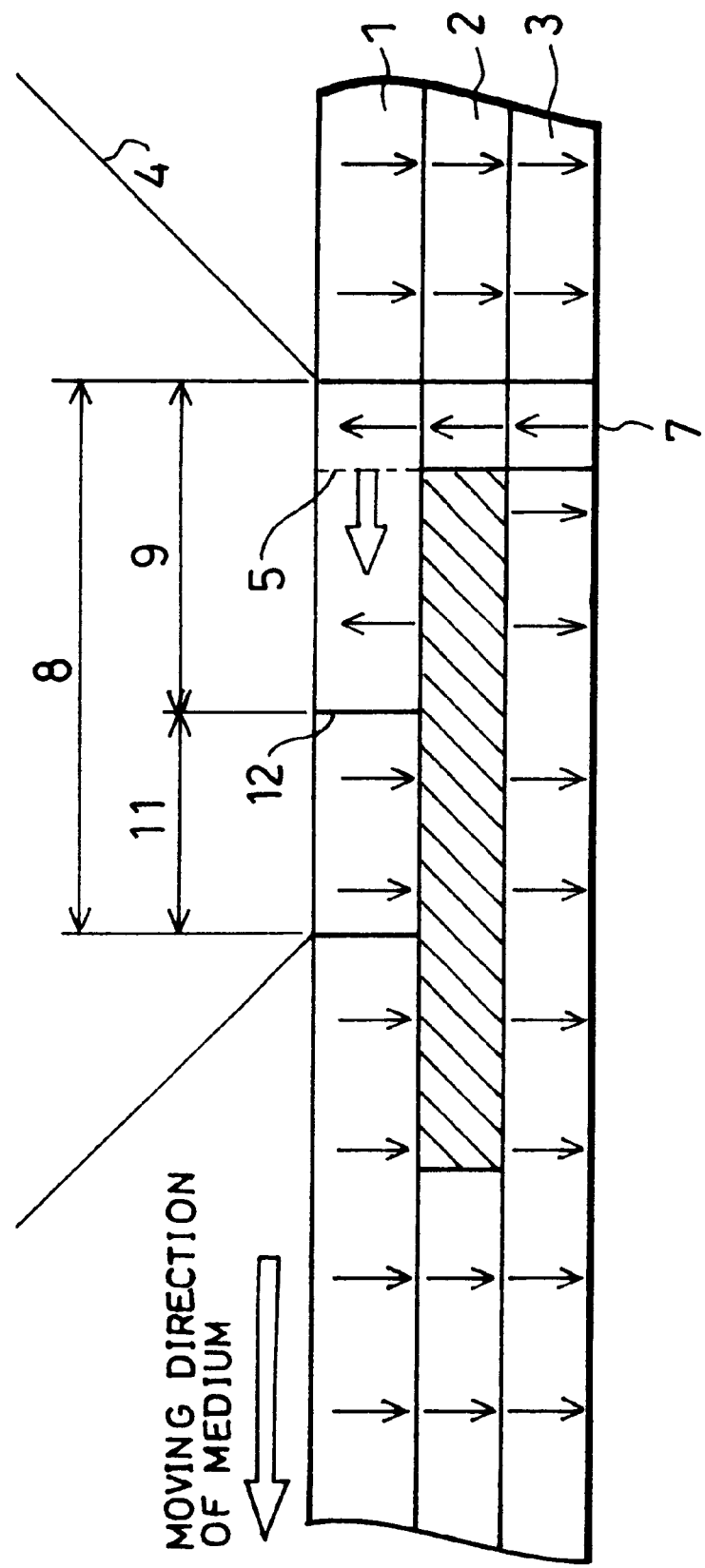
FIG. 2 is a depictive cross section explaining the principle of reproducing information on the magneto-optical disk of the present invention.
Figure 3:
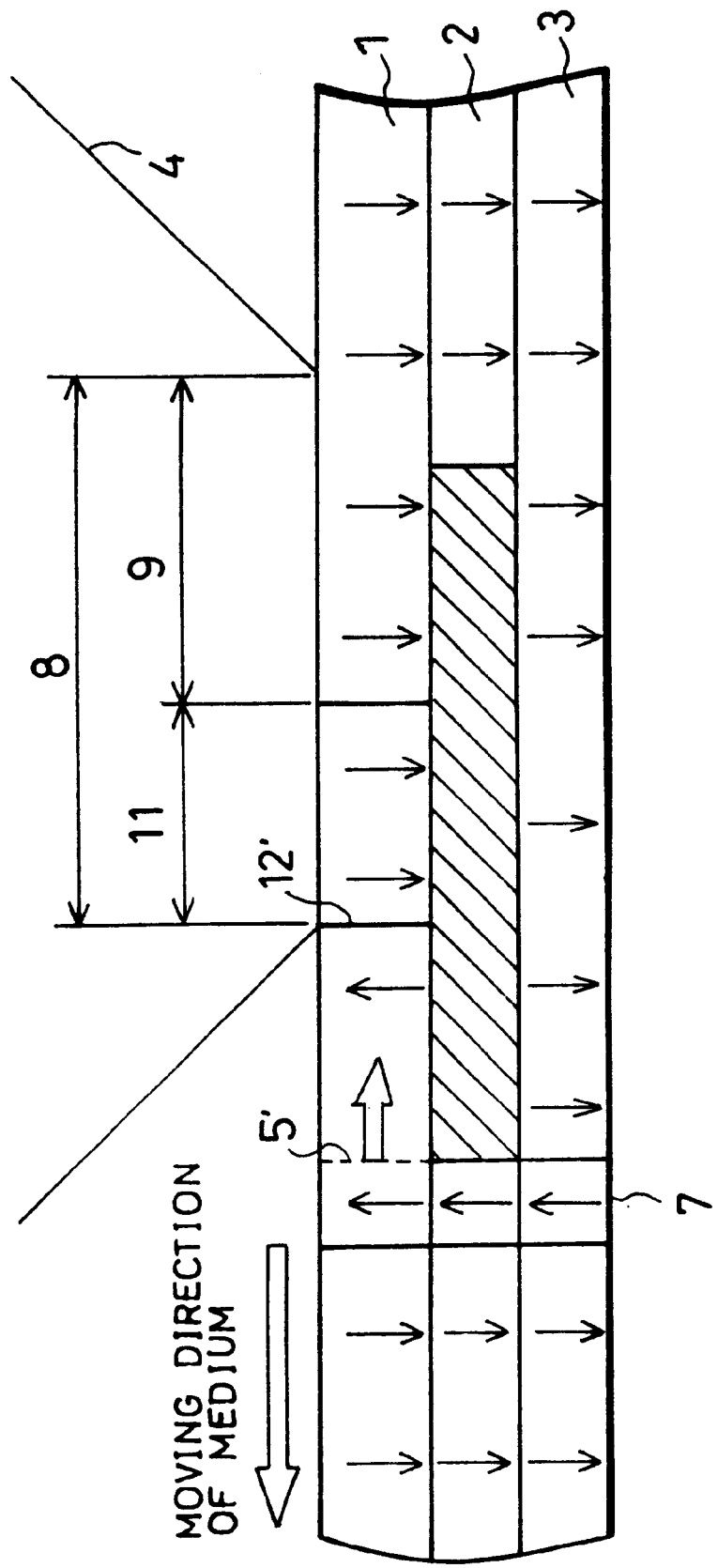
FIG. 3 is a depictive cross section explaining the principle of reproducing information on the magneto-optical disk of the present invention.
Figure 9:
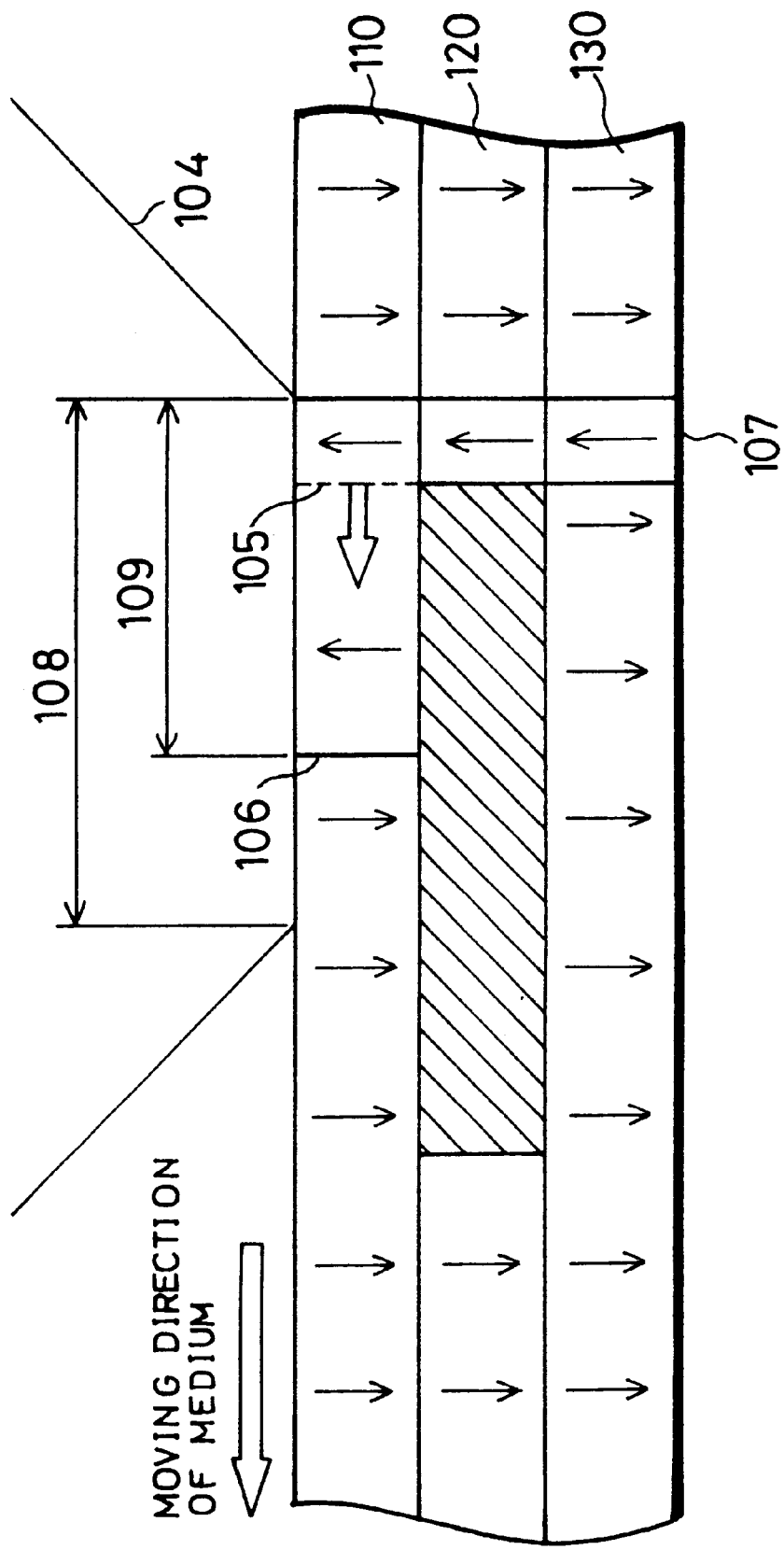
FIG. 9 is a depictive cross section explaining the principle of reproducing information on the conventional magneto-optical disk.
Figure 10:
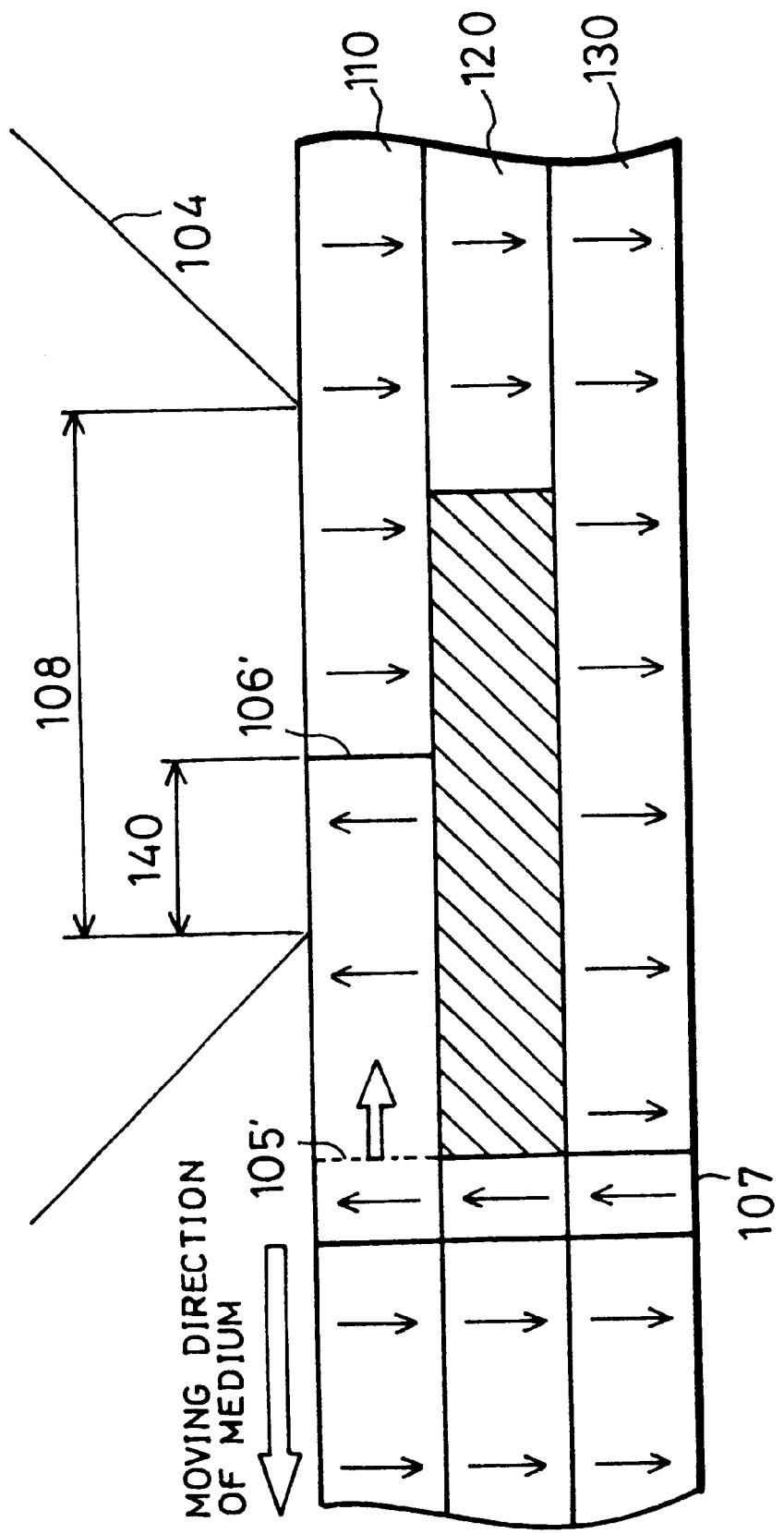
FIG. 10 is a depictive cross section explaining the principle of reproducing information on the conventional magneto-optical disk.

Like FIGS. 9 and 10 used for explaining a prior art, FIGS. 2 and 3 show depictive cross sections for explaining a state of displacement of an isolated magnetic domain 7 caused by a movement of the medium.

As illustrated in FIG. 2, when the isolated magnetic domain 7 is located at the front part of the light beam 4, like FIG. 9, the domain wall 5 is moved to a compensation temperature region 12 located on the front side of the light beam 4, thereby realizing domain enlargement readout. On the other hand, as shown in FIG. 3, when the isolated magnetic domain 7 is located at a rear part, like FIG. 9, the domain wall 5' is moved to a compensation temperature region 12' on the rear side of the light beam 4, and is stopped.

Here, since a magnetic domain enlarged on the rear part is present outside of a region 8 irradiated with the light beam 4, the information can never be reproduced from this part by the light beam 4. It is thus possible to achieve domain enlargement readout only from the front part, without causing repetitious readout as explained with reference to FIGS. 9 and 10.

Consequently, a long recording magnetic domain can be read out accurately, and the information recorded by the high-density mark edge recording can be reproduced.

The following description will explain some examples of magneto-optical disks as the magneto-optical recording medium of the present invention.

Figure 4:
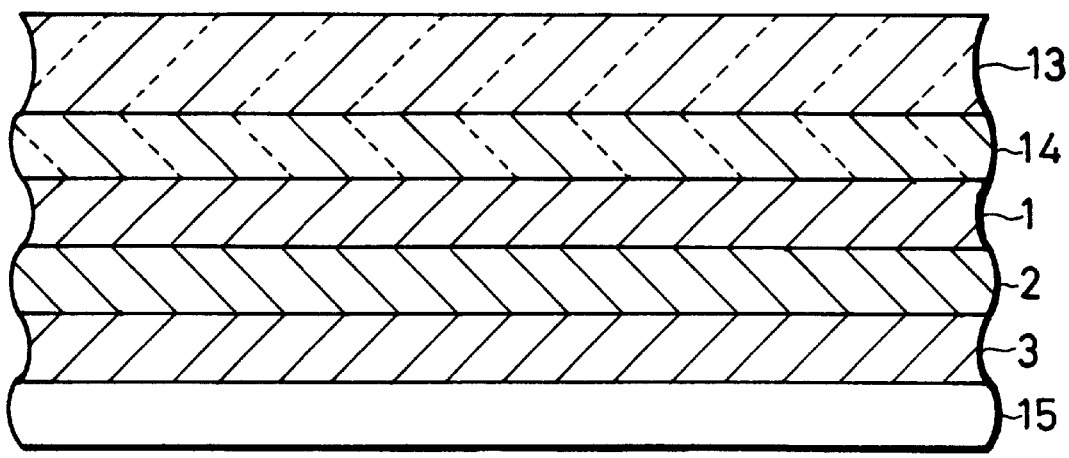
FIG. 4 is a cross section showing the structure of the magneto-optical disk of the present invention.

As shown in FIG. 4, a magneto-optical recording medium of this embodiment includes a transparent dielectric protective layer 14, a first magnetic layer 1, a second magnetic layer 2, a third magnetic layer 3 and a protective film 15, which are layered in this order on a magneto-optical disk substrate 13.

Such a magneto-optical disk employs a Curie temperature recording method as the recording method, and performs recording by controlling the magnetization direction in the third magnetic layer 3 by converging the light beam 4 emitted from a semiconductor laser on the first magnetic layer 1 through the optical disk substrate 13 and transparent dielectric protective layer 14 so as to heat the third magnetic layer 3 to a temperature equal to or higher than the Curie temperature and by applying an external magnetic field. During reproduction, the light beam 4 is set to a power weaker than that in recording, and the information is reproduced by a magneto-optical effect known as the polar Kerr effect. The polar Kerr effect is a phenomenon in which the direction of a rotation of the polarized plane of reflected light is reversed by the direction of magnetization perpendicular to the light incident surface.

The magneto-optical disk substrate 13 is formed of a transparent base material, for example, polycarbonate, in the shape of a disk, and has guide grooves 16 for guiding the light beam 4 on a film formed surface. According to the present invention, information can be recorded on either of lands 17 and the grooves 16, or both of the lands 19 and grooves 16. The depth of the groove 16 is preferably at least two times the thickness of the first magnetic layer 1.

Figure 5:
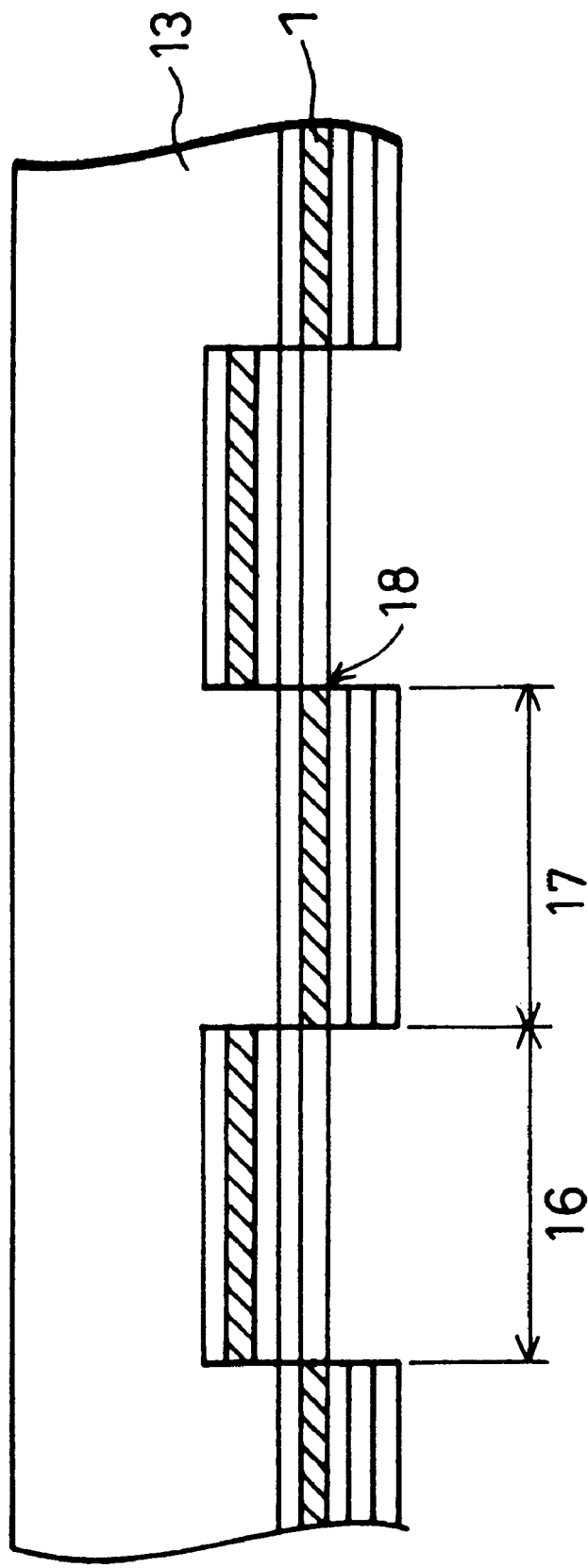
FIG. 5 is an explanatory view showing the structure of the magneto-optical disk of the present invention.

FIG. 5 is a cross section of the magneto-optical recording medium having the guide grooves 16 on the optical disk substrate 13. The guide groove 16 has a rectangular cross section with a depth of 100 nm, which is more than two times the film thickness, 40 nm, of the first magnetic layer 1. Therefore, the first magnetic layers 1 layered on the lands 17 are substantially separated by a gap 18 between the guide groove 16 and the land 18. In actual fact, since the first magnetic layers 1 are formed by sputtering, a magnetic film is also formed at the gap 18 and connects the first magnetic layers 1. However, since the film is extremely thin, the magnetic coupling at the gap 18 can be ignored.

Figure 6:
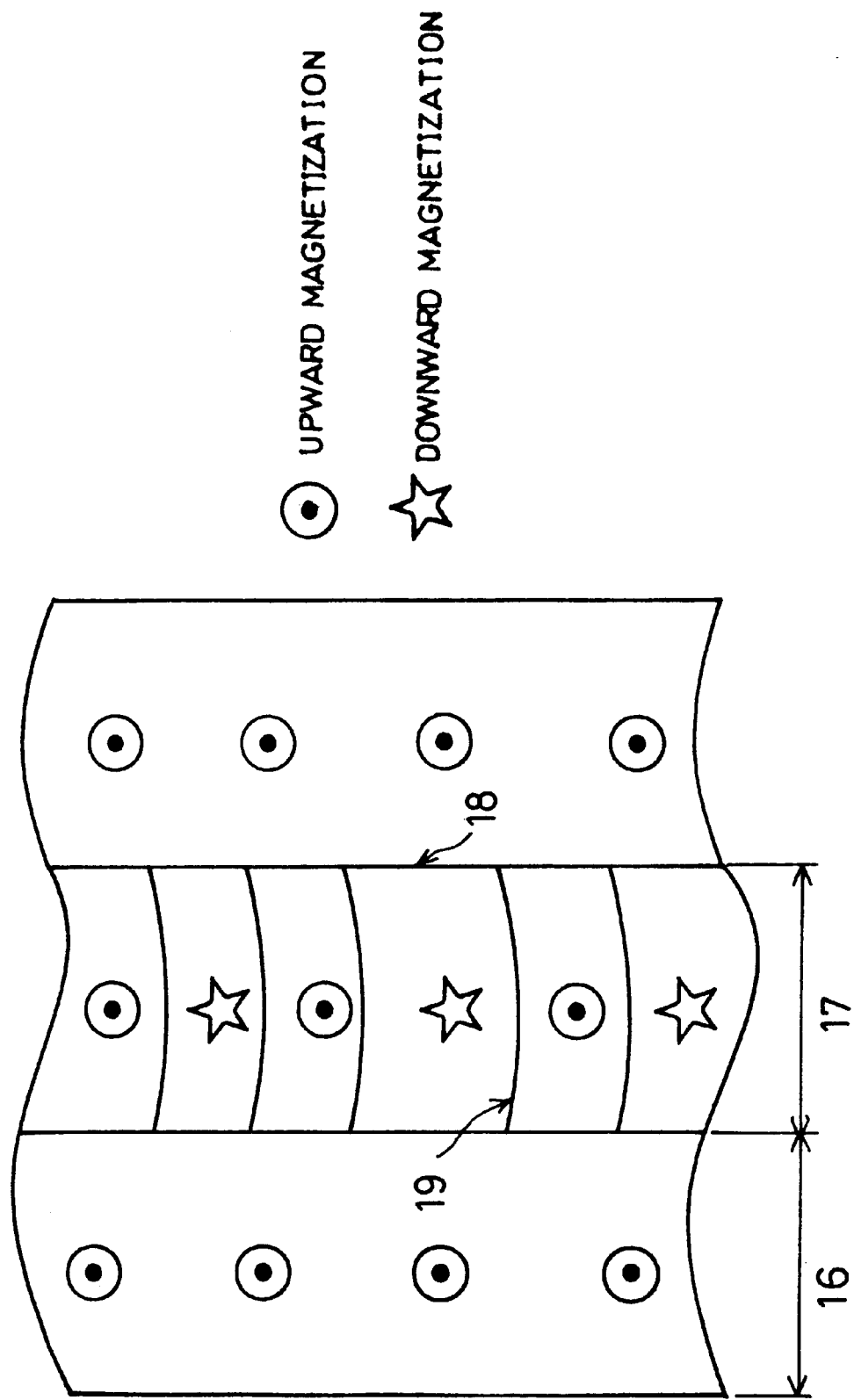
FIG. 6 is an explanatory view explaining a domain wall of the magneto-optical disk of the present invention.

In the present invention, information tracks being magnetically separated from each other are in such a state. When a switched magnetic domain is formed over the entire width of the land 17, as shown in FIG. 6, a domain wall is not formed at a boundary section between adjacent magnetic domains at the gap 18, but an unclosed domain wall 21 is formed at the boundary section between adjacent magnetic domains on the land 17. Even if such an unclosed domain wall 21 is moved in a track direction, it does not cause generation or elimination of a domain wall at the gap 18. Thus, the domain wall 21 can be moved easily.

For the transparent dielectric protective layer 14, it is preferred to use a transparent dielectric such as AlN, SiN, AlSiN, and $Ta_2O_3$. The film thickness of the transparent dielectric protective layer 14 needs to be set so that a satisfactory interference effect is realized with respect to the incident light beam 4 and the polar Kerr rotation angle of the medium is increased. More specifically, the film thickness of the transparent dielectric protective layer 14 is set to around ($\lambda/(4n)$) where $\lambda$ is the wavelength of the light beam 4 and n is the refractive index of the transparent dielectric protective layer 14. For instance, when the wavelength of the light beam 4 is 680 nm, the transparent protective layer 14 can have a film thickness ranging from about 40 nm to about 100 nm.

The Curie temperature Tc1 of the first magnetic layer 1 is preferably higher than 240° C. When $Tc1 \leq 240°$ C., a decrease of the Kerr rotation angle due to a lowering of the Curie temperature of the first magnetic layer 1 is noticeable, and the intensity of the readout signal is lowered. Consequently, satisfactory reproduction properties can not be obtained.

Moreover, the film thickness of the first magnetic layer 1 is preferably in a range of from 20 nm to 80 nm. If the film thickness of the first magnetic layer 1 is less than 20 nm, a satisfactory masking effect is not obtained due to an increase in the amount of light transmitted therethrough, and the intensity of the readout signal is lowered, resulting in deterioration of the reproduction properties. On the other hand, if the film thickness of the first magnetic layer 1 is more than 80 nm, deterioration of the recording sensitivity due to the increase in the film thickness is noticeable.

As the first magnetic layer 1 s satisfying the above magnetic properties, it is possible to use a perpendicularly magnetized film made of material such as GdFe, GdFeCo or GdFeD and GdFeCoD (D is an element selected from Y, Ti, V, Cr, Pd, Cu, Si and Al, or two or more kinds of these elements); GdHRFe, GdHRFeCo or GdHRFeCoD (HR is a heavy rare earth metal and an element selected from Tb, Dy, Ho and Er, or two or more kinds of these elements, and D is an element selected from Y, Ti, V, Cr, Pd, Cu, Si and Al, or two or more kinds of these elements); and GdLRFe, GdLRFeCo or GdLRFeCoD (LR is a light rare earth metal and an element selected from Ce, Pr, Nd and Sm, or two or more kinds of these elements, and D is an element selected from Y, Ti, V, Cr, Pd, Cu, Si and Al, or two or more kinds of these elements).

In order to effectively limit the movement of the domain wall from the rear end of the light beam 4 in the vicinity of the compensation temperature of the first magnetic layer 1, it is preferred to use a material with relatively high wall coercivity among the above-mentioned materials. However, too high wall coercivity prevents a smooth movement of the domain wall at a temperature equal to or lower than the compensation temperature. In order not to prevent a smooth movement of the domain wall at a temperature equal to or lower than the compensation temperature, it is preferred to arrange the wall coercivity at room temperature to be 32 kA/m or less.

The second magnetic layer 2 is formed of a magnetic film made of a rare earth and transition metal alloy, and has a Curie temperature lower than the Curie temperatures of the first magnetic layer 1 and third magnetic layer 3. The Curie temperature Tc2 of the second magnetic layer 2 is preferably within a range of from 40° C. to 220° C. When $Tc2 < 40°$ C., since the Curie temperature of the second magnetic layer 2 is too low, it is difficult to stably maintain the exchange coupling between the first magnetic layer 1 and third magnetic layer 3 in an area where the temperature is not increased, causing deterioration of the quality of the readout signal. On the other hand, when $Tc2 > 220°$ C., since the first magnetic layer 1 and third magnetic layer 3 are exchange coupled even in a high-temperature region, a region permitting an enlargement of the magnetic domain becomes narrower, the intensity of the readout signal is lowered, and the signal quality is deteriorated.

Further, the film thickness of the second magnetic layer 2 is preferably in a range of from 2 nm to 80 nm. If the film thickness of the second magnetic layer 2 is less than 2 nm, the exchange coupling between the first magnetic layer 1 and third magnetic layer 3 can not be cut off in an area where the second magnetic layer 2 is heated to the Curie temperature or a higher temperature. Therefore, the movement of the domain wall in the first magnetic layer 1 is interfered, and it is difficult to achieve magnetic domain enlargement readout in a stable manner. On the other hand, if the film thickness of the second magnetic layer 2 is more than 80 nm, deterioration of the recording sensitivity due to the increase in the film thickness is noticeable.

As the second magnetic layer 2 satisfying the above magnetic properties, it is possible to use a perpendicularly magnetized film made of material such as TbFe, TbFeCo, DyFe, DyFeCo, TbDyFe, TbDyFeCo, TbFeD, TbFeCoD, DyFeD, DyFeCoD, TbDyFeD, and TbDyFeCoD (D is an element selected from Y, Ti, V, Cr, Pd, Cu, Si and Al, or two or more kinds of these elements).

The third magnetic 3 layer is formed of a perpendicularly magnetized film made of a rare earth and transition metal alloy, and has a Curie temperature higher than the Curie temperature of the second magnetic layer 2. The Curie temperature Tc3 of the third magnetic layer 3 is preferably within a range of from 180° C. to 300° C. When Tc3<180° C., since the Curie temperature of the third magnetic layer 3 is too low, the medium is heated to the Curie temperature of the third magnetic layer 3 or a higher temperature by a slight increase of temperature in heating the first magnetic layer 1 to the compensation temperature or a higher temperature during reproduction, and the recorded information is erased. Thus, the power margin is excessively narrow. On the other hand, when Tc3>300° C., it is necessary to heat the third magnetic layer 3 to 300° C. or a higher temperature to perform recording, and the recording sensitivity deteriorates noticeably. Additionally, since the first magnetic layer 1, second magnetic layer 2 and third magnetic layer 3 are heated to 300° C. or a higher temperature, the magnetic properties of the respective layers deteriorate, and the quality of the readout signal is deteriorated by the erasure of recording.

Besides, the film thickness of the third magnetic layer 3 is preferably set within a range of from 5 nm to 80 nm. If the film thickness of the third magnetic layer 3 is less than 5 nm, it is difficult to perform stable recording, and the quality of the readout signal is deteriorated by an increase of recording noise. On the other hand, if the film thickness of the third magnetic layer 3 is more than 80 nm, deterioration of the recording sensitivity due to the increase in the film thickness is noticeable.

As the third magnetic layer 3 satisfying the above magnetic properties, it is possible to use a perpendicularly magnetized film made of material such as TbFe, TbFeCo, DyFe, DyFeCo, TbDyFe, and TbDyFeCo.

The protective film 15 is made of a transparent dielectric such as AlN, SiN, AlSiN and $Ta_2O_3$, or a non-magnetic metal alloy formed of metal such as Al, Ti, Ta and Ni. The protective film 15 is provided for the purpose of preventing oxidation of the rare earth and transition metal alloys used for the first magnetic layer 1, second magnetic layer 2, and third magnetic layer 3, and has a thickness ranging from 5 nm to 60 nm.

Moreover, in this structure, by additionally providing a thermal diffusion metal layer made of Al, AlTa, AlTi, AlCr, AlNi, AlCo, Cu or the like on the protective layer 15, it is possible to improve the thermal properties of the medium. Besides, in some cases, an ultraviolet ray setting resin, a thermosetting resin, or a lubricant layer is formed on the protective layer 15 or the thermal diffusion layer.

Further, for the purpose of achieving low magnetic field recording, it is also possible to layer adjacent to the third magnetic layer 3 a recording auxiliary layer formed of a perpendicularly magnetized film, which is made of, for example, GdFeCo, GdTbFeCo, or GdDyFeCo and has a coercive force smaller than that of the third magnetic layer 3 and a higher Curie temperature than the third magnetic layer 3.

SPECIFIC EXAMPLE 1

The following description will explain specific examples of a method of fabricating a magneto-optical disk of the above-mentioned structure and a recording and reproducing method.

(1) Method of Fabricating A Magneto-optical Disk

A method of fabricating a magneto-optical disk of the above-mentioned structure will be explained below. First, the optical disk substrate 13 formed of polycarbonate in the shape of a disk with guide grooves of a depth of 100 nm is placed in a sputtering device provided with an Al target, a GdFeCo alloy target, a TbFeSi alloy target and a TbFeCo alloy target. After evacuating the inside of the sputtering device to $1\times10^{-6}$ Torr, a mixed gas of argon and nitrogen is introduced and power is supplied to the Al target to provide the transparent dielectric protective layer 14 made of AlN in a film thickness of 80 nm on the optical disk substrate 13 under the condition of a gas pressure of $4\times10^{-3}$ Torr.

Next, after evacuating the inside of the sputtering device to $1\times10^{-6}$ Torr again, an argon gas is introduced and power is supplied to the GdFeCo alloy target to provide the first magnetic layer 1 made of $Gd_{0.30}(Fe_{0.90}Co_{0.10})_{0.70}$ in a film thickness of 40 nm on the transparent dielectric protective layer 14 under the condition of a gas pressure of $4\times10^{-3}$ Torr. The first magnetic layer 1 is a perpendicularly magnetized film with a compensation temperature of 190° C. and a Curie temperature of 290° C.

Subsequently, by supplying power to the TbFeSi alloy target, the second magnetic layer 2 made of $(Tb_{0.24}Fe_{0.76})_{0.80}Si_{0.20}$ is provided in a film thickness of 10 nm on the first magnetic layer 1 under the condition of a gas pressure of $4\times10^{-3}$ Torr. The second magnetic layer 2 is a perpendicularly magnetized film with a compensation temperature of 40° C. and a Curie temperature of 120° C.

Then, by supplying power to the TbFeCo alloy target, the third magnetic layer 3 made of $Tb_{0.25}(Fe_{0.83}Co_{0.17})_{0.75}$ is provided in a film thickness of 30 nm on the second magnetic layer 2 under the condition of a gas pressure of $4\times10^{-3}$ Torr. The third magnetic layer 3 is a perpendicularly magnetized film with a compensation temperature of 80° C. and a Curie temperature of 290° C.

Next, by introducing a mixed gas of argon and nitrogen and supplying power to the Al target, the protective film 15 made of AlN is provided in a film thickness of 20 nm on the third magnetic layer 3 under the condition of a gas pressure of $4\times10^{-3}$ Torr.

(2) Recording and Reproduction Properties

The above-described magneto-optical disk was evaluated with a magneto-optical pickup using a semiconductor laser with a wavelength of 680 nm under the condition of a linear velocity of 2.5 m/s. The results of the evaluation are as follows.

First, a repeated pattern of upward magnetization and downward magnetization corresponding to the directions of the recording magnetic fields was formed in the third magnetic layer 3 by modulating a recording magnetic field at ±15 kA/m while continuously irradiating the recording and reproduction-use laser at 6.5 mW. By changing the modulation frequency of the recording magnetic field, a magnetic domain patten of a mark length ranging from 0.1 μm to 0.5 μm was recorded. Here, the mark length means that the recording magnetic domains with a length corresponding to the mark length are formed at a pitch two times longer than the mark length.

Next, the recording and reproduction-use laser was continuously irradiated at 2.0 mW to measure the dependence of the CNR (signal to noise ratio) on the mark length <Specific Example 1>. The result of measurement of Specific Example 1 is shown in FIG. 7.

Figure 7:
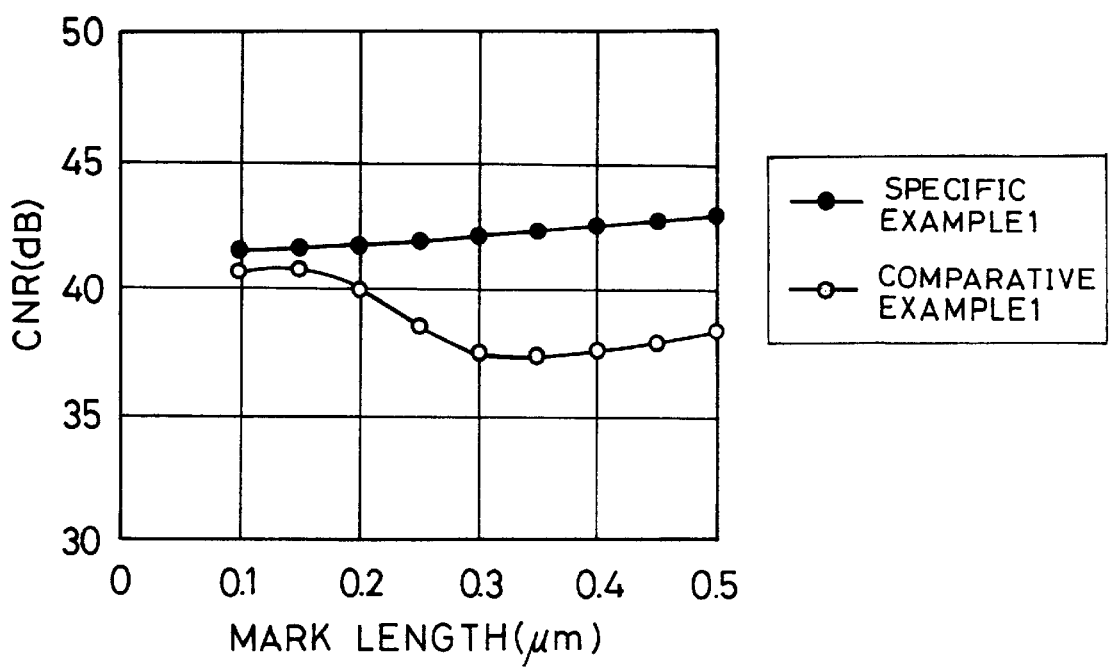
FIG. 7 is a graph showing the dependence of the CNR on the mark length of the magneto-optical disk of the present invention.
Figure 8:
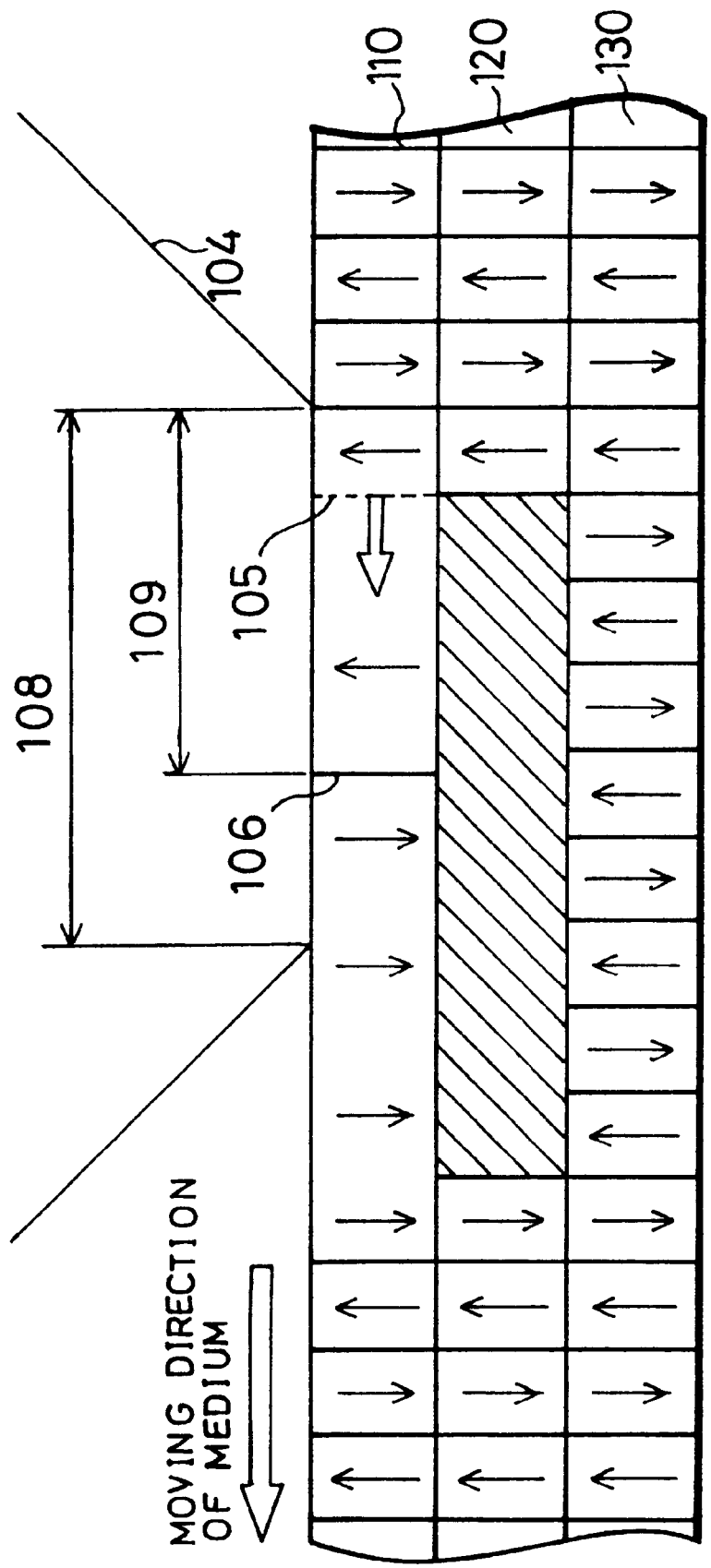
FIG. 8 is a depictive cross section explaining the principle of reproducing information on a conventional magneto-optical disk.

For comparison purposes, the CNR of the following magneto-optical disk is shown as Comparative Example 1 in FIG. 7. This magneto-optical disk has the structure of Specific Example 1 with the exception that the first magnetic layer 1 is formed of GdFeCo having a Curie temperature of 290° C. and a RErich composition in which the rare earth metal (RE) magnetic moment is always larger in contrast with a compensation composition in which the rare earth metal (RE) magnetic moment and the transition metal (TM) magnetic moment are balanced out at room temperature or higher temperatures.

It was found by comparing Specific Example 1 and Comparative Example 1 that a CNR of 40 dB or more was obtained for both of the examples when the mark length was 0.15 μm or less, but the CNR of Comparative Example 1 was abruptly lowered when the mark length was more than 0.15 μm. In Comparative Example 1, when the mark length becomes longer, an enlarged magnetic domain obtained by a movement of a domain wall from the rear part and an enlarged magnetic domain obtained by a movement of a domain wall from the front part are read simultaneously. As a result, readout noise is increased, and the above-mentioned abrupt lowering of the CNR occurs.

On the other hand, in Specific Example 1, the movement of the domain wall from the rear part is stopped in an area where the first magnetic layer 1 is heated to the vicinity of the compensation temperature, and the enlarged magnetic domain provided by the movement of the domain wall from the rear part does not enter into the light beam spot. Therefore, even when the mark length is 0.15 μm or more, a lowering of the CNR is not observed at all. Thus, it was confirmed that the magneto-optical recording medium of Specific Example 1 can realize magnetic domain enlargement readout only from the front part without causing repetitious readout, and is applicable to mark edge recording.

The above explanation shows the results of examining the recording and reproduction properties of a magneto-optical recording medium including a perpendicularly magnetized film made of $Gd_{0.30}(Fe_{0.90}Co_{0.10})_{0.70}$ with a compensation temperature of 190° C. and a Curie temperature of 290° C. as the first magnetic layer 1; a perpendicularly magnetized film made of $(Tb_{0.24}Fe_{0.76})_{0.80}Si_{0.20}$ with a compensation temperature of 40° C. and a Curie temperature of 120° C. as the second magnetic layer 2; and a perpendicularly magnetized film made of $Tb_{0.25}(Fe_{0.83}Co_{0.17})_{0.75}$ with a compensation temperature of 80° C. and a Curie temperature of 290° C. as the third magnetic layer 3. However, it is also possible to use magnetic layers having magnetic properties other than those mentioned above for the magnetic layers of the present invention.

SPECIFIC EXAMPLE 2

In this specific example, magneto-optical disks were fabricated according to the magneto-optical recording medium of Specific Example 1 with the only exception that the magnetic properties of the first magnetic layer 1 were changed by adjusting the composition thereof, and the recording and reproduction properties of the magneto-optical disks were examined. The CNR was measured for a mark length of 0.1 μm by changing the compensation temperature by a change of the ratio of the rare earth metal to the transition metal contained in the first magnetic layer 1, and the results of measurement are shown in Table 1. The measurement was carried out by adjusting the readout power for each disk so as not to cause a lowering of the CNR for a mark length of 0.3 μm, i.e., so as not to cause repetitious readout due to a movement of the domain wall from the rear part.

TABLE 1

| Disk | First magnetic layer composition | Compensation temp. (° C.) | Curie temp. (° C.) | CNR |
| --- | --- | --- | --- | --- |
| No.1-1 | $Gd_{0.33}(Fe_{0.90}Co_{0.10})_{0.67}$ | 280 | 285 | 11.6 dB |
| No.1-2 | $Gd_{0.32}(Fe_{0.90}Co_{0.10})_{0.68}$ | 260 | 285 | 41.2 dB |
| No.1-3 | $Gd_{0.33}(Fe_{0.90}Co_{0.10})_{0.69}$ | 220 | 290 | 41.4 dB |
| No.1-4 | $Gd_{0.30}(Fe_{0.90}Co_{0.10})_{0.70}$ | 190 | 290 | 41.5 dB |
| No.1-5 | $Gd_{0.29}(Fe_{0.90}Co_{0.10})_{0.71}$ | 160 | 295 | 41.3 dB |
| No.1-6 | $Gd_{0.28}(Fe_{0.90}Co_{0.10})_{0.72}$ | 125 | 295 | 10.3 dB |

In disk No. 1-1, the first magnetic layer 1 has an extremely high compensation temperature of 280° C. which is very close to the Curie temperature, 290° C., of the third magnetic layer 3. Therefore, in disk No. 1-1, a part of the third magnetic layer 3 was heated to a temperature equal to or higher than the Curie temperature by the light beam 4 irradiated during reproduction, and a part of recorded information was erased. As a result, satisfactory readout signals were not obtained, and the CNR was extremely low. It was understood from this result that a preferred compensation temperature of the first magnetic layer 1 is not higher than 260° C.

Besides, in disk No. 1-6, the compensation temperature of the first magnetic layer 1 is 125° C. which is very close to the Curie temperature of the second magnetic layer 2. Therefore, the difference between a position where the exchange coupling between the first magnetic layer 1 and the third magnetic layer 3 was cut off and the magnetic domain started to move and a position where the movement of the domain wall was stopped was very small, and magnetic domain enlargement readout was not realized on the front side of the light beam 4. Hence, the CNR was extremely low. It was understood from this result that a preferred compensation temperature of the first magnetic layer 1 is not lower than 160° C.

SPECIFIC EXAMPLE 3

In this specific example, magneto-optical disks were fabricated according to the magneto-optical recording medium of Specific Example 1 with the exception that the wall coercivity of the first magnetic layer 1 was changed by adding Dy to GdFeCo of the first magnetic layer 1. By indicating the coercive force at room temperature as the wall coercivity, the relationship between the CNR and the wall coercivity of the disks was examined for a mark length of 0.1 μm. As a result, it was confirmed that the CNR of the disk having the first magnetic layer 1 whose wall coercivity is more than 32 kA/m was lowered significantly. The reason for such a lowering is as follows. Since the wall coercivity of the first magnetic layer 1 is large, the movement of the domain wall does not occur even when the second magnetic layer 2 is heated to the Curie temperature or a higher temperature by the irradiation of the light beam 4, and magnetic domain enlargement readout is not realized. Thus, the wall coercivity of the first magnetic layer 1 is preferably 32 kA/m or less.

SPECIFIC EXAMPLE 4

In this specific example, magneto-optical disks were fabricated according to the magneto-optical recording medium of Specific Example 1 with the only exception that the magnetic properties of the second magnetic layer 2 were changed by adjusting the composition thereof, and the recording and reproduction properties were examined. The CNR was measured for a mark length of 0.1 μm by changing the Curie temperature of the second magnetic layer 2 by a change of the content of Si of the second magnetic layer 2, and the results of measurement are shown in Table 2. Here, since the ratio of the rare earth metal to the transition metal contained in the second magnetic layer 2 was fixed, the compensation temperature of the second magnetic layer 2 was always 40° C. The measurement was carried out by adjusting the readout power for each disk so as not to cause a lowering of the CNR for a mark length of 0.3 μm, i.e., so as not to cause repetitious readout due to a movement of the domain wall from the rear part.

TABLE 2

| Disk | Second magnetic layer composition | Compensation temp. (° C.) | Curie temp. (° C.) | CNR |
|---|---|---|---|---|
| No.2-1 | $(Tb_{0.24}Fe_{0.76})_{0.95}Si_{0.05}$ | 40 | 180 | 16.7 dB |
| No.2-2 | $(Tb_{0.24}Fe_{0.76})_{0.90}Si_{0.10}$ | 40 | 160 | 41.3 dB |
| No.2-3 | $(Tb_{0.24}Fe_{0.76})_{0.85}Si_{0.15}$ | 40 | 135 | 41.4 dB |
| No.2-4 | $(Tb_{0.24}Fe_{0.76})_{0.80}Si_{0.20}$ | 40 | 120 | 41.5 dB |
| No.2-5 | $(Tb_{0.24}Fe_{0.76})_{0.75}Si_{0.25}$ | 40 | 100 | 41.3 dB |
| No.2-6 | $(Tb_{0.24}Fe_{0.76})_{0.70}Si_{0.30}$ | 40 | 75 | 40.8 dB |
| No.2-7 | $(Tb_{0.24}Fe_{0.76})_{0.65}Si_{0.35}$ | NE | 40 | 39.6 dB |
| No.2-8 | $(Tb_{0.24}Fe_{0.76})_{0.60}Si_{0.40}$ | NE | 25 | 7.6 dB |

In Table 2, NE means that there is no compensation temperature. A satisfactory CNR was obtained for disk No. 2-2 through No. 2-7, but the CNR was extremely low for disk No. 2-1 and No. 2-8. In disk No. 2-1, since the Curie temperature of the second magnetic layer 2 was very close to the compensation temperature, 190° C., of the first magnetic layer 1, the magnetic domain enlarged region was extremely narrow at the front part of the light beam. Therefore, magnetic domain enlargement readout was not executed, and the CNR was lowered. It was understood from this result that it is preferred to satisfy $$Tc2 \leq Tcomp1 - 30° C.$$

where Tcomp1 is the compensation temperature of the first magnetic layer 1 and Tc2 is the Curie temperature of the second magnetic layer 2.

Moreover, in disk No. 2-8, the second magnetic layer 2 had an extremely low Curie temperature of 25° C., and the exchange coupling between the first magnetic layer 1 and third magnetic layer 3 was cut off depending on the environment temperature. Therefore, the recording magnetic domain in the third magnetic layer 3 was not copied to the first magnetic layer 1 in a stable manner. Thus, it can be understood that the Curie temperature of the second magnetic layer 2 is preferably 40° C. or above.

SPECIFIC EXAMPLE 5

In this specific example, magneto-optical disks were fabricated according to the magneto-optical recording medium of Specific Example 1 with the only exception that the magnetic properties of the third magnetic layer 3 were changed by adjusting the composition thereof, and the recording and reproduction properties were adjusted. The CNR was measured for a mark length of 0.1 μm by changing the compensation temperature and Curie temperature of the third magnetic layer 3 by a change of the composition of the third magnetic layer 3, and the results of measurement are shown in Table 3. In disk No. 3-1 through No. 3-6, the compensation temperature was made substantially constant at 80° C. and the Curie temperature was changed by substituting Fe of TbFe with Co.

TABLE 3

| Disk | Third magnetic layer composition | Compensation temp. (° C.) | Curie temp. (° C.) | CNR |
|---|---|---|---|---|
| No.3-1 | $Tb_{0.25}(Fe_{0.77}Co_{0.23})_{0.75}$ | 80 | 320 | 41.6 dB |
| No.3-2 | $Tb_{0.25}(Fe_{0.80}Co_{0.20})_{0.75}$ | 80 | 300 | 41.6 dB |
| No.3-3 | $Tb_{0.25}(Fe_{0.83}Co_{0.17})_{0.75}$ | 80 | 290 | 41.5 dB |
| No.3-4 | $Tb_{0.25}(Fe_{0.89}Co_{0.11})_{0.75}$ | 80 | 255 | 41.4 dB |
| No.3-5 | $Tb_{0.25}(Fe_{0.94}Co_{0.06})_{0.75}$ | 80 | 215 | 40.7 dB |
| No.3-6 | $Tb_{0.25}Fe_{0.75}$ | 80 | 190 | 11.2 dB |
| No.3-7 | $Tb_{0.32}(Fe_{0.83}Co_{0.17})_{0.68}$ | NE | 275 | 29.1 dB |
| No.3-8 | $Tb_{0.30}(Fe_{0.83}Co_{0.17})_{0.70}$ | 270 | 280 | 41.5 dB |
| No.3-9 | $Tb_{0.28}(Fe_{0.83}Co_{0.17})_{0.72}$ | 190 | 285 | 41.4 dB |
| No.3-10 | $Tb_{0.25}(Fe_{0.83}Co_{0.17})_{0.75}$ | 80 | 290 | 41.5 dB |
| No.3-11 | $Tb_{0.22}(Fe_{0.83}Co_{0.17})_{0.78}$ | −20 | 300 | 41.3 dB |
| No.3-12 | $Tb_{0.19}(Fe_{0.83}Co_{0.17})_{0.81}$ | −110 | 305 | 32.6 dB |

In disk No. 3-1, a high CNR of more than 41 dB was obtained. However, after repeating recording and erasure 10,000 times, only a CNR of 35 dB was obtained under the same measurement conditions. The reason for such a result is as follows. Since the Curie temperature of the third magnetic layer 3 of disk No. 3-1 was as high as 320° C., the respective magnetic layers were heated to at least 320° C. for recording and erasure, and the magnetic properties of the magnetic layers were deteriorated. On the other hand, in disk No. 3-2 whose third magnetic layer 3 had a Curie temperature of 300° C., the same CNR was obtained even after performing recording and erasure 10,000 times. Thus, a preferred Curie temperature of the third magnetic layer 3 is no more than 300° C.

Moreover, the CNR of disk No. 3-6 was low because the difference between the Curie temperature of the third magnetic layer 3 and the compensation temperature of the first magnetic layer 1 was small. According to the magneto-optical recording medium of the present invention, it is necessary to heat at least a part of the first magnetic layer 1 to the compensation temperature or a higher temperature during reproduction. In disk No. 3-6, however, since the compensation temperature of the first magnetic layer 1 was 190° C., the third magnetic layer 3 was heated to the Curie temperature or a higher temperature during reproduction, and a part of the recorded information was erased. As a result, the CNR was lowered. Thus, it can be understood that it is preferred to satisfy at least $$Tcomp1 < Tc3$$

where Tcomp1 is the compensation temperature of the first magnetic layer 1 and Tc3 is the Curie temperature of the third magnetic layer 3.

Next, in disk No. 3-7 through No. 3-12, the compensation temperature of the third magnetic layer 3 was changed by changing the ratio of the rare earth metal to the transition metal contained in the third magnetic layer 3 while maintaining a fixed ratio of Fe to Co. A compensation temperature of NE of disk No. 3-7 means that there was no compensation temperature and the third magnetic layer 3 always had a RErich composition up to the Curie temperature.

In disk No. 3-7 and No. 3-12, the CNR was low for the following reasons. The compensation temperature of the third magnetic layer 3 deviated from the temperature range for reproduction, and the total magnetization of the third magnetic layer 3 was increased. As a result, a leakage magnetic flux generated from the third magnetic layer 3 was increased, and the movement of the domain wall in the first magnetic layer 1 was prevented. Consequently, the noise of the readout signals was increased, and the CNR was deteriorated.

Thus, it is preferred to satisfy at least $$-20°\text{ C.} \leq \text{Tcomp3} < \text{Tc3}$$

where Tcomp3 is the compensation temperature of the third magnetic layer 3 and Tc3 is the Curie temperature of the third magnetic layer 3.

As described above, according to the magneto-optical recording medium and reproducing method of the present invention, it is possible to realize magnetic domain enlargement readout without causing repetitious readout, and reproduce signals of a cycle equal to or less than the diffraction limit of light without lowering the amplitude of the readout signals, thereby achieving a significant improvement in the recording density.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium comprising at least a first magnetic layer, a second magnetic layer and a third magnetic layer, which are layered in this order, the first magnetic layer being formed of a perpendicularly magnetized film having a relatively small wall coercivity and a relatively large wall mobility compared with the third magnetic layer in vicinity of a predetermined temperature, the magneto-optical recording medium satisfying conditions $$\text{Tc2} < \text{Tcomp1} < \text{Tc1} \text{ and}$$
$$\text{Tc2} < \text{Tcomp1} < \text{Tc3}$$

where Tcomp1 is a compensation temperature of the first magnetic layer, Tc1, Tc2 and Tc3 are Curie temperatures of the first, second and third magnetic layers, respectively.

2. The magneto-optical recording medium as set forth in claim 1, wherein the compensation temperature Tcomp1 of the first magnetic layer satisfies a condition $$160°\text{ C.} \leq \text{Tcomp1} \leq 260°\text{ C.}$$

3. The magneto-optical recording medium as set forth in claim 1, wherein the wall coercivity of the first magnetic layer is not higher than 32 kA/m.

4. The magneto-optical recording medium as set forth in claim 1, wherein the magneto-optical recording medium satisfies a condition $$40°\text{ C.} \leq \text{Tc2} \leq \text{Tcomp1} - 30°\text{ C.}$$

where Tcomp1 is a compensation temperature of the first magnetic layer and Tc2 is a Curie temperature of the second magnetic layer.

5. The magneto-optical recording medium as set forth in claim 1, wherein the magneto-optical recording medium satisfies a condition $$-20°\text{ C.} \leq \text{Tcomp3} \leq \text{Tc3}$$

where Tcomp3 is a compensation temperature of the third magnetic layer and Tc3 is a Curie temperature of the third magnetic layer.

6. The magneto-optical recording medium as set forth in claim 1, wherein the Curie temperature Tc1 of the first magnetic layer satisfies a condition $$\text{Tc1} \leq 240°\text{ C.}$$

7. The magneto-optical recording medium as set forth in claim 1, wherein the first magnetic layer has a film thickness ranging from 20 nm to 80 nm.

8. The magneto-optical recording medium as set forth in claim 1, wherein the Curie temperature Tc2 of the second magnetic layer satisfies a condition $$40°\text{ C.} \leq \text{Tc2} \leq 220°\text{ C.}$$

9. The magneto-optical recording medium as set forth in claim 1, wherein the second magnetic layer has a film thickness ranging from 2 nm to 80 nm.

10. The magneto-optical recording medium as set forth in claim 1, wherein the Curie temperature Tc3 of the third magnetic layer satisfies a condition $$180°\text{ C.} \leq \text{Tc3} \leq 300°\text{ C.}$$

11. The magneto-optical recording medium as set forth in claim 1, wherein the third magnetic layer has a film thickness ranging from 5 nm to 80 nm.

12. A reproducing device for reproducing information from a magneto-optical recording medium including at least a first magnetic layer, a second magnetic layer and a third magnetic layer, which are layered in this order, the first magnetic layer being formed of a perpendicularly magnetized film having a relatively small wall coercivity and a relatively large wall mobility compared with the third magnetic layer in vicinity of a predetermined temperature, the magneto-optical recording medium satisfying conditions $$\text{Tc2} < \text{Tcomp1} < \text{Tc1} \text{ and}$$
$$\text{Tc2} < \text{Tcomp1} < \text{Tc3}$$

where Tcomp1 is a compensation temperature of the first magnetic layer, Tc1, Tc2 and Tc3 are Curie temperatures of the first, second and third magnetic layers, respectively, said reproducing device comprising:

irradiating means for irradiating a light beam on the magneto-optical recording medium during reproduction; and control means for controlling an irradiation intensity of the light beam to an intensity capable of heating the first magnetic layer of the magneto-optical recording medium to the compensation temperature or a higher temperature.

13. The reproducing device as set forth in claim 12, wherein the compensation temperature Tcomp1 of the first magnetic layer satisfies a condition $$160° C. \leq Tcomp1 \leq 260° C.$$

14. The reproducing device as set forth in claim 12, wherein the wall coercivity of the first magnetic layer is not higher than 32 kA/m.

15. The reproducing device as set forth in claim 12, wherein the magneto-optical recording medium satisfies a condition $$40° C. \leq Tc2 \leq Tcomp1 - 30° C.$$

where Tcomp1 is a compensation temperature of the first magnetic layer and Tc2 is a Curie temperature of the second magnetic layer.

16. The reproducing device as set forth in claim 12, wherein the magneto-optical recording medium satisfies a condition $$-20° C. \leq Tcomp3 \leq Tc3$$

where Tcomp 3 is a compensation temperature of the third magnetic layer and Tc3 is a Curie temperature of the third magnetic layer.

17. The magneto-optical recording medium as set forth in claim 1, wherein the first magnetic layer is made of a rare earth and transition metal alloy.

\* \* \* \* \*